(12) United States Patent
Wang et al.

(10) Patent No.: US 11,687,127 B1
(45) Date of Patent: Jun. 27, 2023

(54) ELECTRONIC DEVICE

(71) Applicant: Acer Incorporated, New Taipei (TW)

(72) Inventors: Wei-Chih Wang, New Taipei (TW); Chen-Min Hsiu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/834,019

(22) Filed: Jun. 7, 2022

(30) Foreign Application Priority Data

Dec. 22, 2021 (TW) .................................. 110215233

(51) Int. Cl.
*G06F 1/16* (2006.01)
(52) U.S. Cl.
CPC .................................... *G06F 1/169* (2013.01)
(58) Field of Classification Search
CPC ...... G06F 1/169; G06F 3/041; G06F 3/03547; G06F 2203/0338
See application file for complete search history.

(56) References Cited

U.S. PATENT DOCUMENTS

| | | | |
|---|---|---|---|
| 8,912,458 B2* | 12/2014 | Peterson | H03K 17/9622 200/344 |
| 2016/0004355 A1* | 1/2016 | Zadesky | G06F 3/033 345/174 |
| 2021/0286440 A1* | 9/2021 | Shim | G06F 1/1616 |

* cited by examiner

*Primary Examiner* — Kevin M Nguyen
(74) *Attorney, Agent, or Firm* — McClure, Qualey & Rodack, LLP

(57) ABSTRACT

An electronic device is provided, including a display module, an input module, a touchpad unit disposed on the input module, several first magnetic elements, and several second magnetic elements. The input module is connected to the display module. The first magnetic elements are disposed on the bottom plate of the touchpad unit, and the second magnetic elements are disposed on the frame of the touchpad unit. The first and second magnetic elements generate a repulsion force to keep the frame in an initial position relative to the bottom plate.

8 Claims, 15 Drawing Sheets

ELECTRONIC DEVICE

CROSS REFERENCE TO RELATED APPLICATIONS

This Application claims priority of Taiwan Patent Application No. 110215233, filed on Dec. 22, 2021, the entirety of which is incorporated by reference herein.

BACKGROUND OF THE INVENTION

Field of the Invention

The present invention relates to an electronic device, and, in particular, to an electronic device that has a touchpad unit.

Description of the Related Art

Conventional laptop computers usually have a touchpad so that the user can control the cursor on the screen or input instructions to the computer. Accurate position detection by the touchpad is highly desirable for the manufacturer. In particular, when the user pushes the touchpad to perform a click action, the force exerted in different positions on the touchpad should be equal, as much as possible, so as to prevent ambiguous haptic feedback of the touchpad sending unintended instructions to the computer. Therefore, how to improve the conventional touchpad mechanism so that the forces exerted on different positions of the touchpad are equal has become a challenge.

BRIEF SUMMARY OF THE INVENTION

An embodiment of the present invention provides an electronic device that includes a display module, an input module, a touchpad unit disposed on the input module, several first magnetic elements, and several second magnetic elements. The input module is connected to the display module. The first magnetic elements are disposed on the bottom plate of the touchpad unit, and the second magnetic elements are disposed on the frame of the touchpad unit. The first and second magnetic elements generate a repulsion force to keep the frame in an initial position relative to the bottom plate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
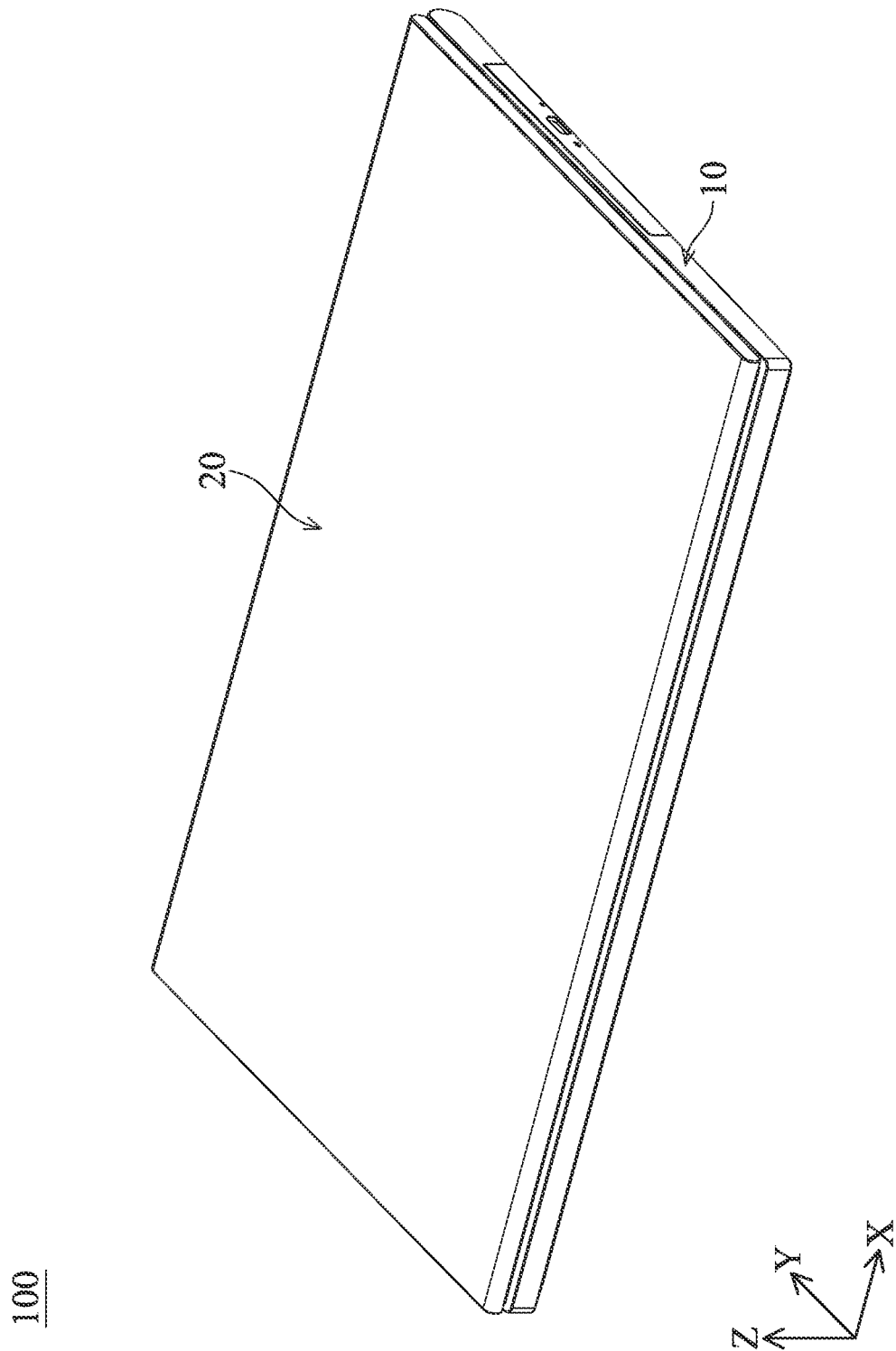
FIG. 1 is a perspective diagram of an electronic device 100 when in a closed state according to an embodiment of the invention.
Figure 2:
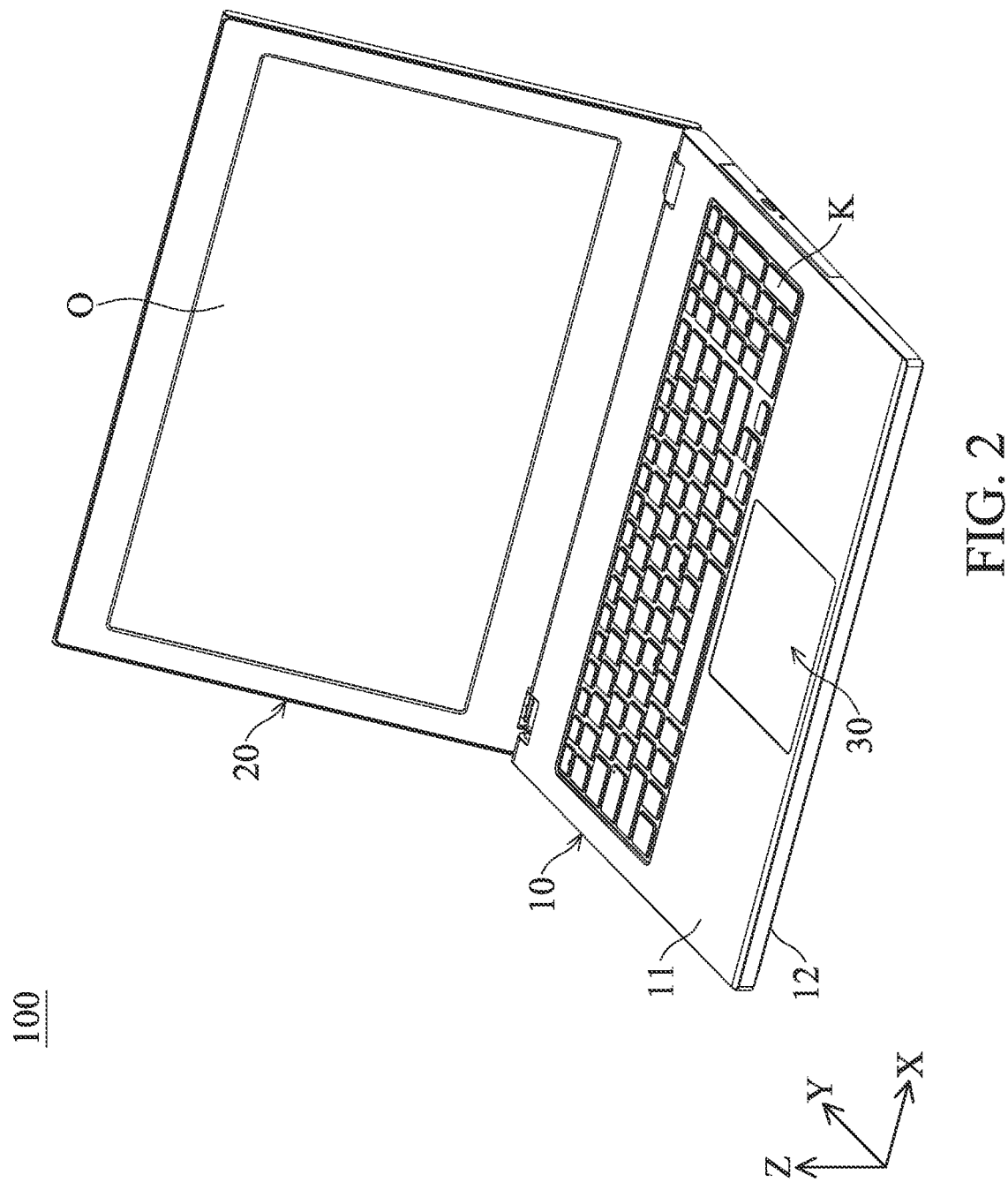
FIG. 2 is a perspective diagram of the electronic device 100 in FIG. 1 when unfolded from the closed state to an open state.
Figure 3:
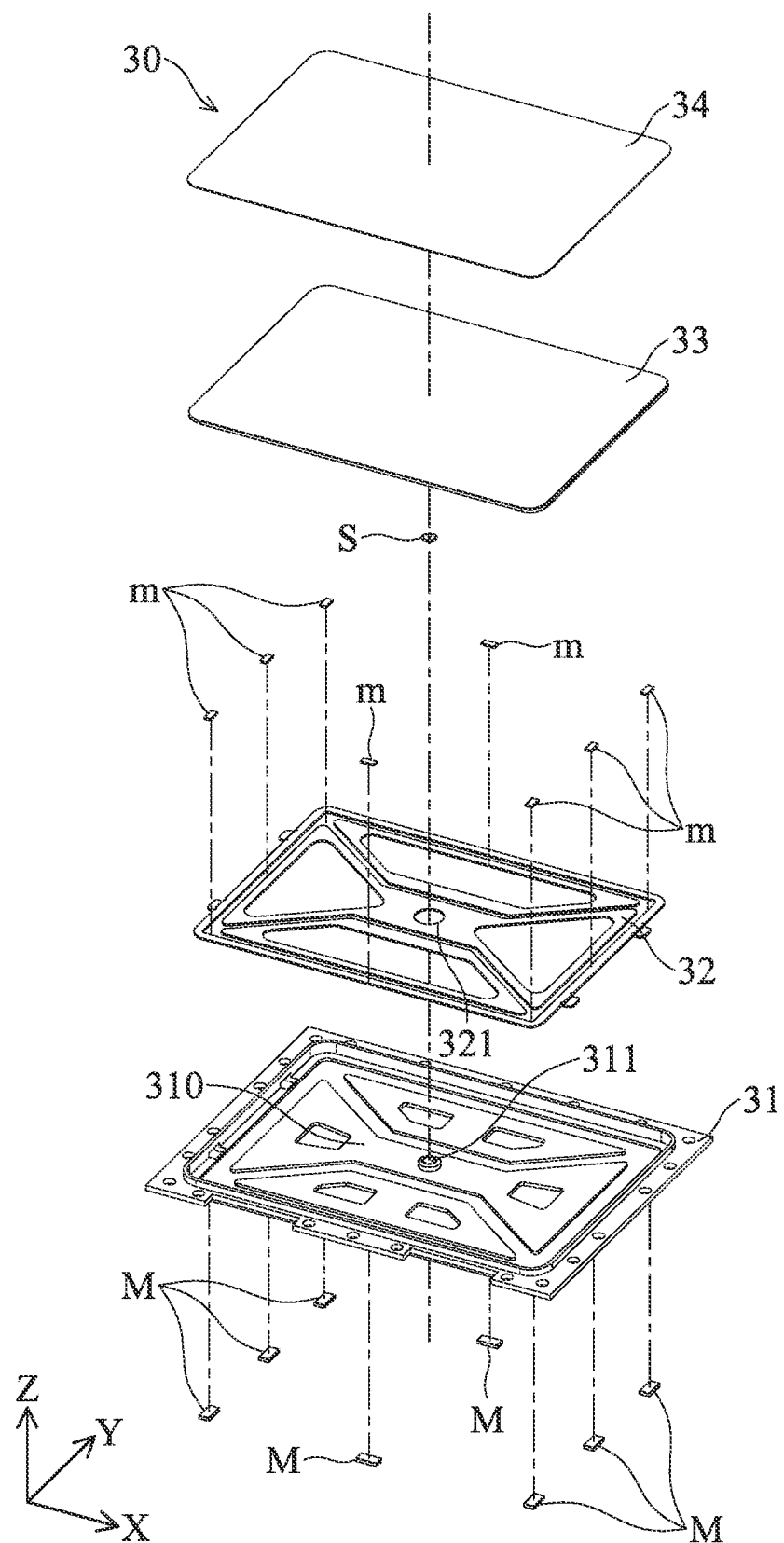
FIG. 3 is an exploded diagram of the touchpad unit 30 in FIG. 2.

FIG. 1 is a perspective diagram of an electronic device 100 when in a closed state according to an embodiment of the invention. FIG. 2 is a perspective diagram of the electronic device 100 in FIG. 1 when unfolded from the closed state to an open state. FIG. 3 is an exploded diagram of the touchpad unit 30 in FIG. 2.

As shown in FIGS. 1 and 2, the electronic device 100 may be a laptop computer that primarily includes an input module 10 and a display module 20 connected to each other. The input module 10 and the display module 20 may be pivotally connected to each other via a hinge, so that the display module 20 is rotatable relative to the input module 10.

In this embodiment, the display module 20 has a screen D (e.g. LCD, OLED or touch screen), and the input module 10 has a first housing 11 and a second housing 12. A keyboard K (e.g. QWERTY keyboard) and a touchpad unit 30 are disposed on the first housing 11, whereby the users can easily use the electronic device 100.

It should be noted that the keyboard K and the touchpad unit 30 can be used as a user input interface. When the display module 20 is unfolded relative to the input module 10, the users can input the instructions or control the mouse cursor on the screen D of the display module 20 through the keyboard K and the touchpad unit 30.

Referring to FIG. 3, the touchpad unit 30 has a bottom plate 31, a frame 32, a touch control circuit board 33, a protection layer 34, and a switch element S. The bottom plate 31 is mounted to the first housing 11 of the input module 10, and the protection layer 34 (e.g. Mylar sheet or other electrical insulating sheet) is adhered to the top surface of the touch control circuit board 33. The frame 32 may comprise a metal material, and it can be mounted to the bottom side of the touch control circuit board 33 using glue or tape, for supporting the touch control circuit board 33 and the protection layer 34. The frame 32, the touch control circuit board 33, and the protection layer 34 are movable relative to the bottom plate 31 along the Z axis after assembly of the touchpad unit 30.

The switch element S is disposed on the bottom side of the touch control circuit board 33 and extends through a through hole 321 at the center of the frame 32, wherein the switch element S directly faces a protrusion 311 formed on the bottom plate 31. When the user pushes the top surface of the protection layer 34, the frame 32, the touch control circuit board 33, and the protection layer 34 move downward (—Z direction) relative to the bottom plate 31 from an initial position to a limit position, so that the switch element S at the bottom of the touch control circuit board 33 is pressed and triggered by the protrusion 311 of the bottom plate 31. Therefore, the user can perform a click action on a menu or input instructions by pushing the touchpad unit 30.

During assembly of the touchpad unit 30, the protection layer 34 is adhered to the top surface of the touch control circuit board 33, and the touch control circuit board 33 is mounted to the frame 32. Hence, the frame 32, the touch control circuit board 33, and the protection layer 34 are arranged in an accommodating space 310 at the center of the bottom plate 31.

In this embodiment, the touchpad unit 30 further has several first magnetic elements M and second magnetic elements m. The first magnetic elements M (e.g. magnets) are disposed on the bottom plate 31, and the second magnetic elements m (e.g. magnets) are disposed on the frame 32. When the touchpad unit 30 is not pressed by an external force, a repulsion force is generated between the first and second magnetic elements M and m, whereby the frame 32, the touch control circuit board 33, and the protection layer 34 can be held in the initial position, and the switch element S is spaced apart from the protrusion 311 of the bottom plate 31. In this state, the switch element S is not in contact with or triggered by the protrusion 311 of the bottom plate 31.

The touchpad unit 3 in FIG. 3 has eight first magnetic elements M and eight second magnetic elements m. The eight first magnetic elements M are disposed on the bottom surface and located close to the four sides of the rectangular bottom plate 31. The eight second magnetic elements m are disposed on the top surface and located close to the four sides of the rectangular of the frame 32, corresponding to the first magnetic elements M.

Figure 4:
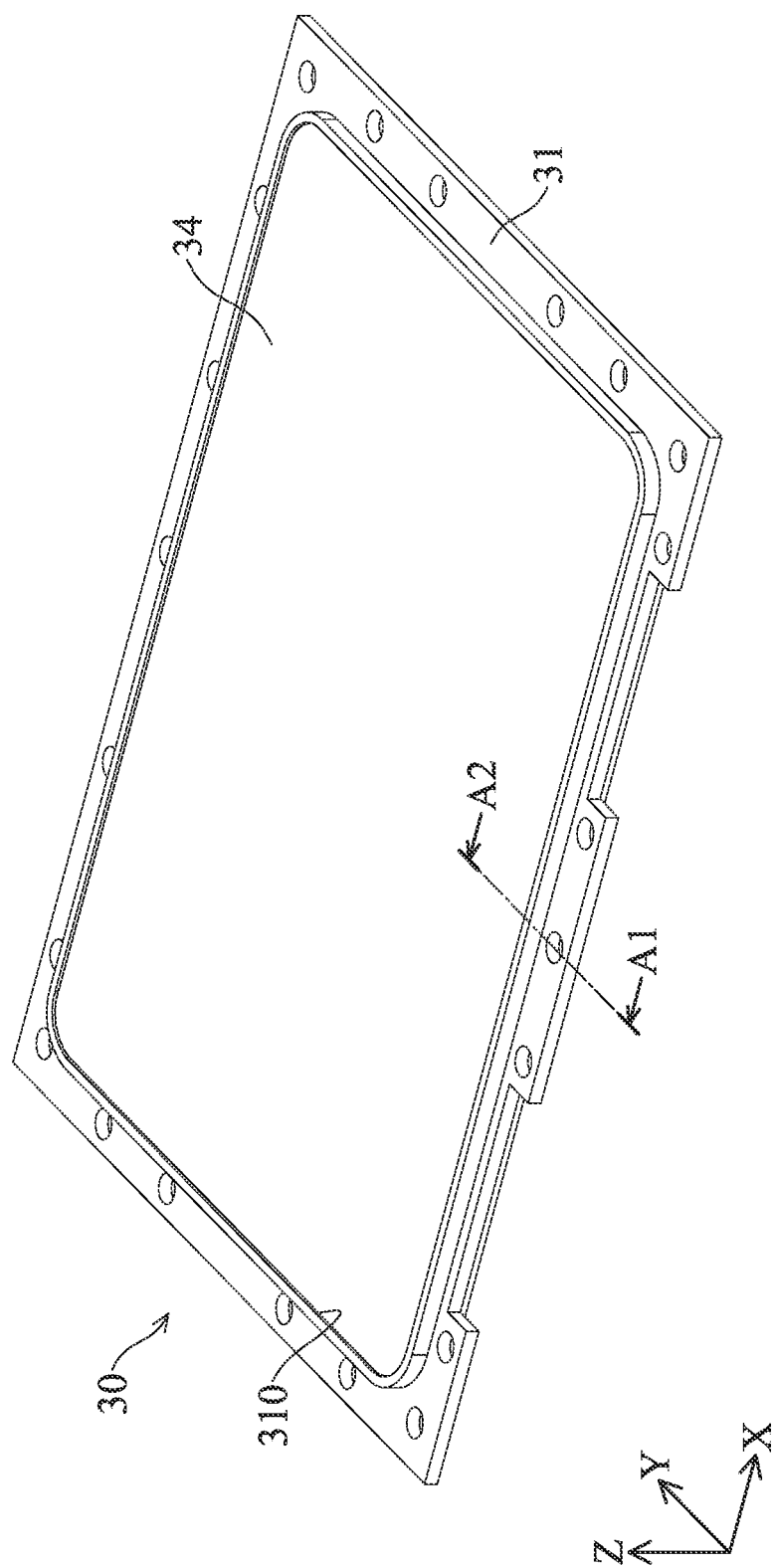
FIG. 4 is a perspective diagram of the touchpad unit 30 in FIG. 3 after assembly.
Figure 5:
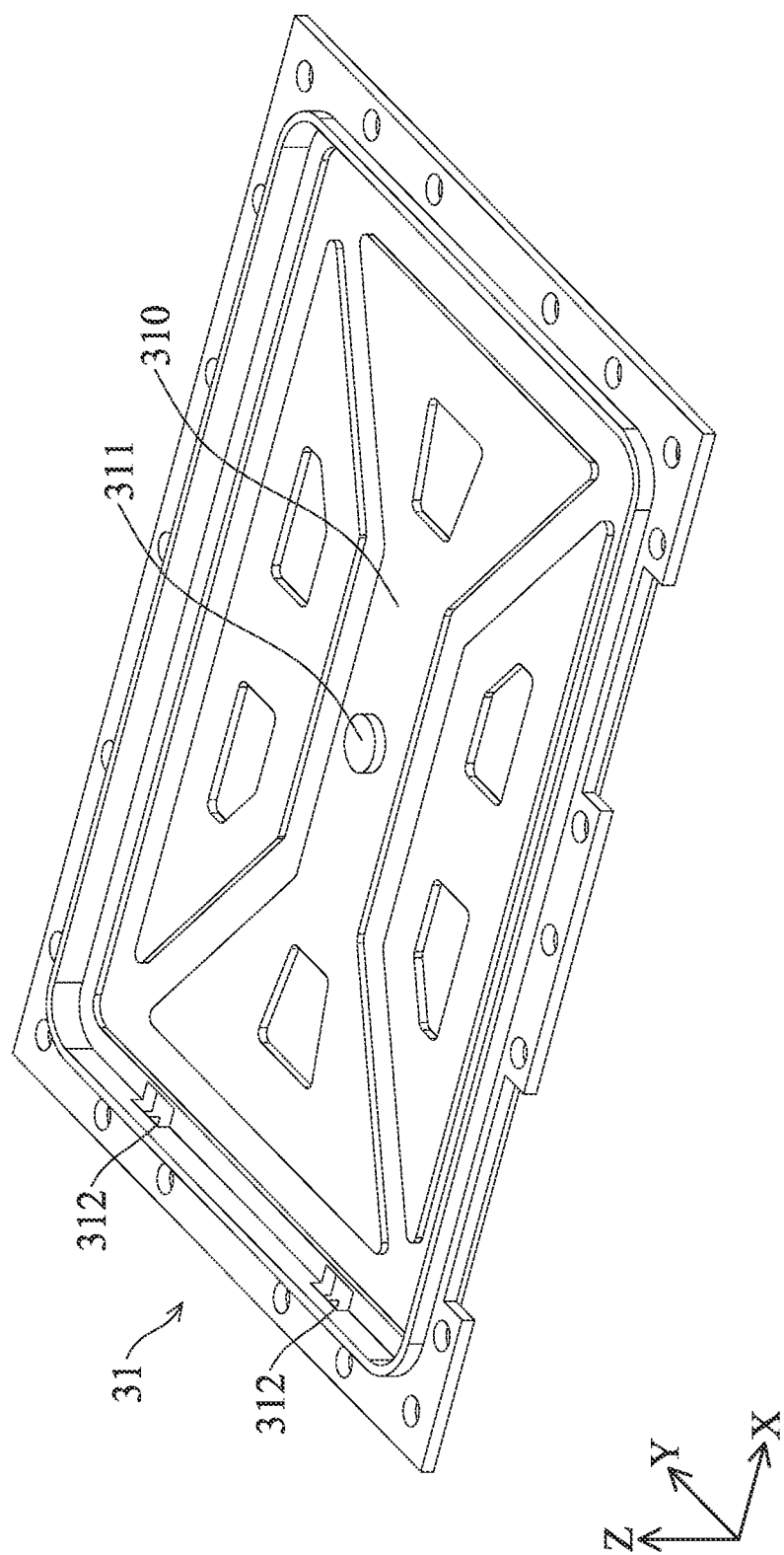
FIG. 5 is a perspective diagram of the bottom plate 31 in FIG. 3.
Figure 6:
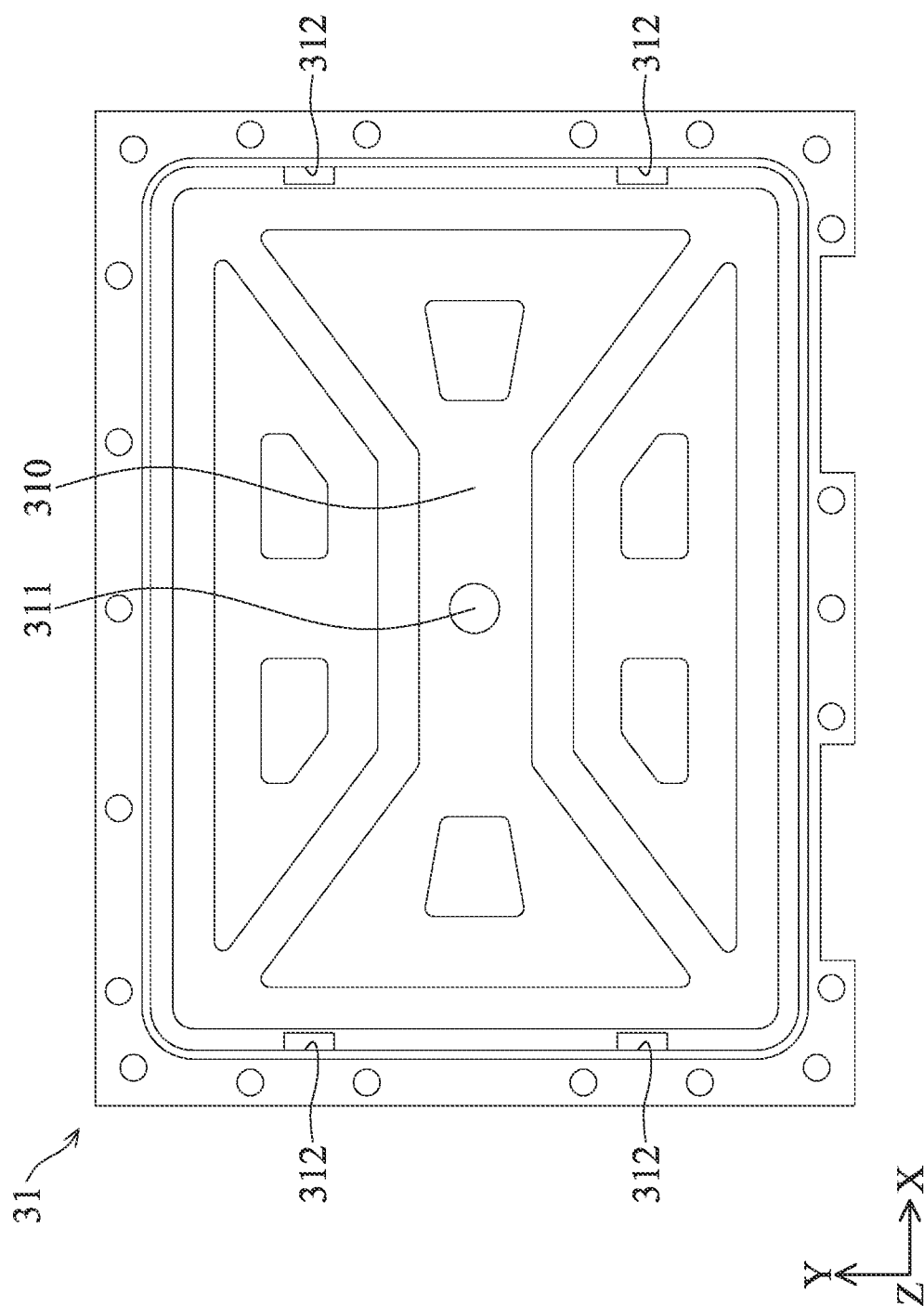
FIG. 6 is a bottom plan view of the bottom plate 31 in FIG. 3.

FIG. 4 is a perspective diagram of the touchpad unit 30 in FIG. 3 after assembly. FIG. 5 is a perspective diagram of the bottom plate 31 in FIG. 3. FIG. 6 is a bottom plan view of the bottom plate 31 in FIG. 3.

Referring to FIGS. 4-6, the frame 32, the touch control circuit board 33, and the protection layer 34 are all received in the accommodating space 310 at the center of the bottom plate 31. Specifically, a plurality of openings 312 are formed on the bottom plate 31 and located on opposite sides of the accommodating space 310. The openings 312 extend through the bottom plate 31 and communicate with the accommodating space 310. During assembly of the touchpad unit 30, the lock tabs 322 of the frame 32 are inserted through the openings 312, whereby the frame 32, the touch control circuit board 33, and the protection layer 34 can be prevented from separation from the accommodating space 310.

Figure 7:
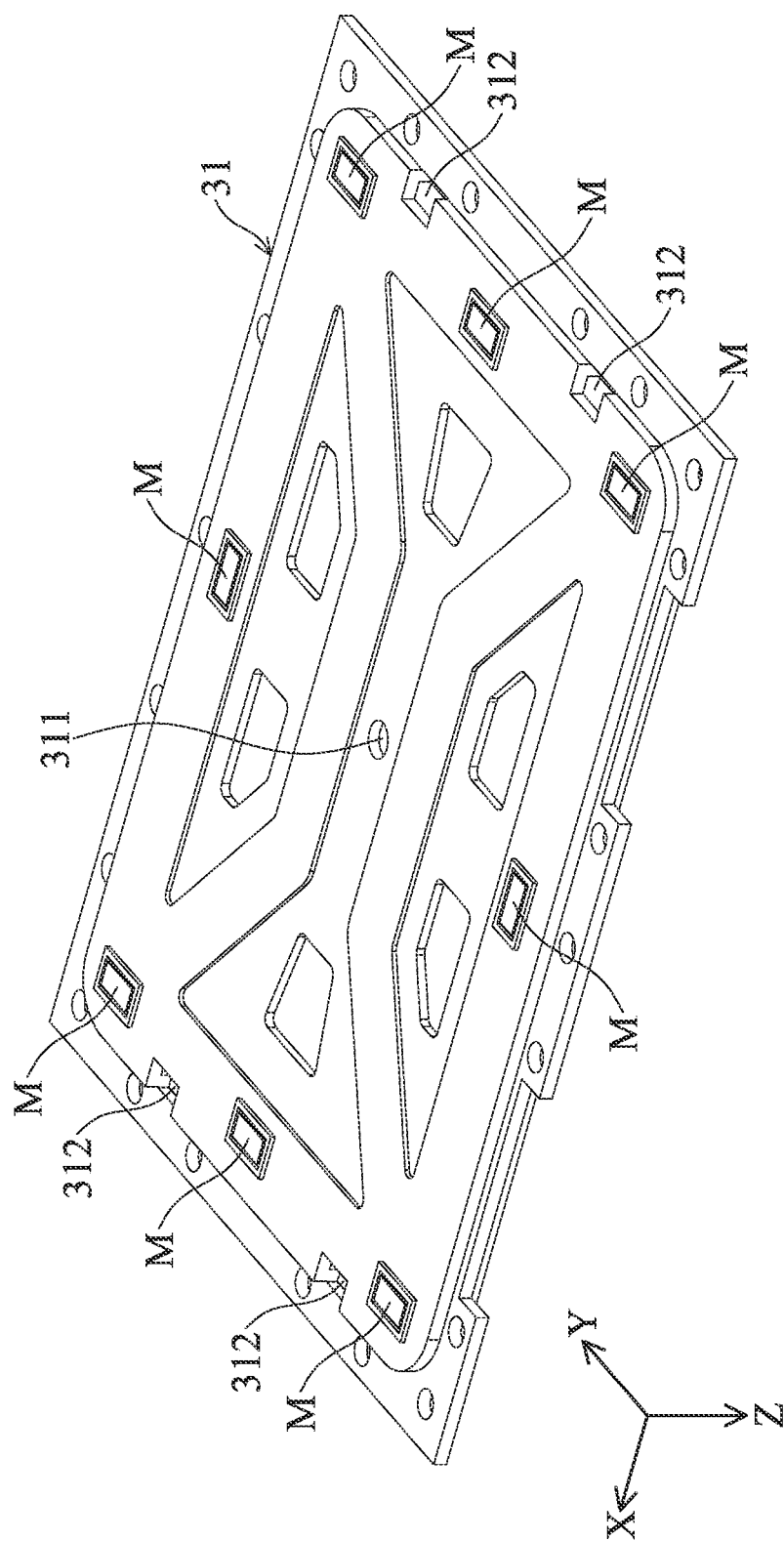
FIG. 7 is a perspective diagram showing the bottom plate 31 and the first magnetic elements M disposed on the bottom plate 31.
Figure 8:
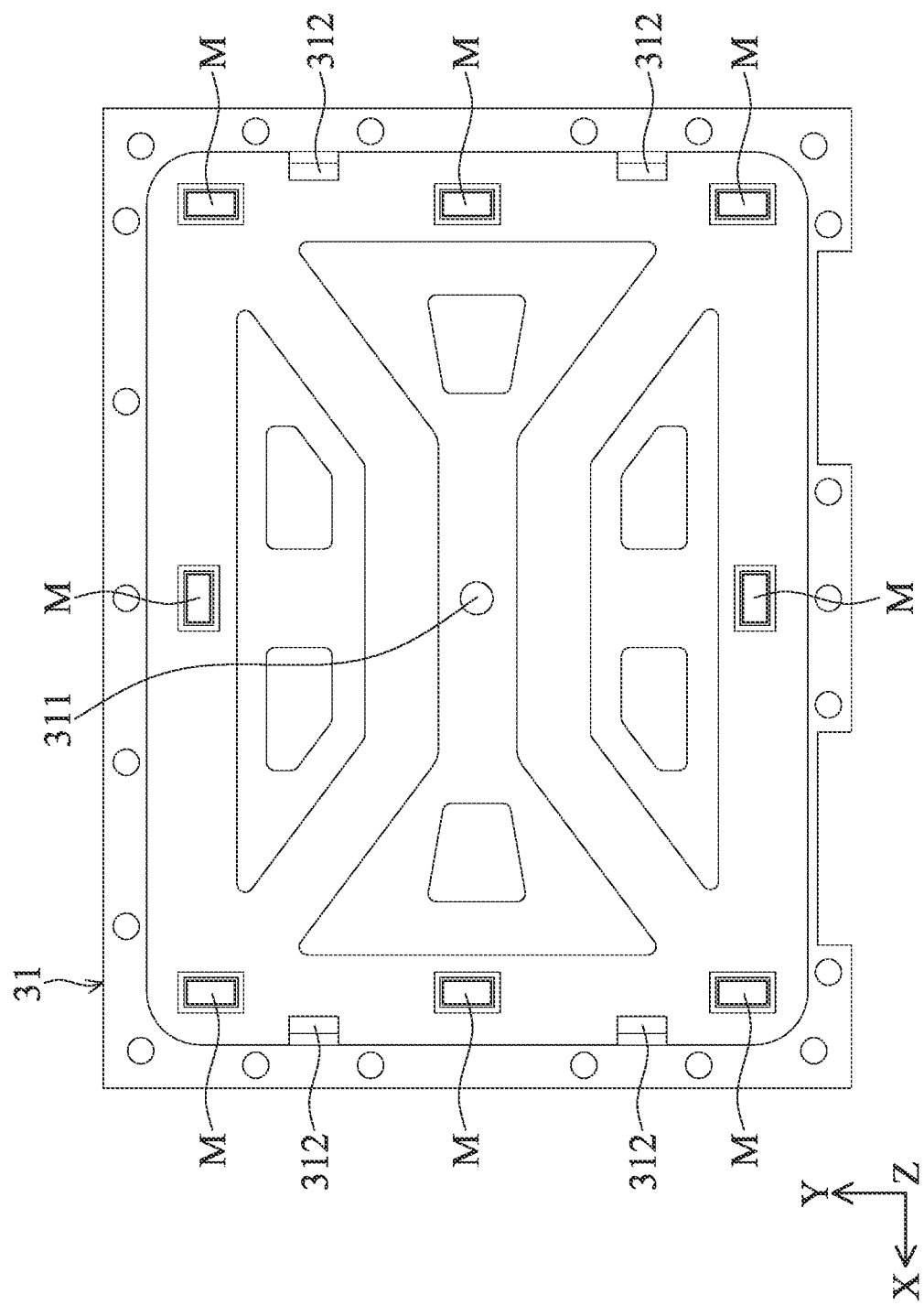
FIG. 8 is a bottom plan view of the bottom plate 31 and the first magnetic elements M disposed on the bottom plate 31.

FIG. 7 is a perspective diagram showing the bottom plate 31 and the first magnetic elements M disposed on the bottom plate 31. FIG. 8 is a bottom plan view of the bottom plate 31 and the first magnetic elements M disposed on the bottom plate 31.

Referring to FIGS. 7 and 8, the bottom plate 31 has a rectangular structure, wherein the first magnetic elements M are affixed to the bottom surface and located close to the four sides of the bottom plate 31.

Figure 9:
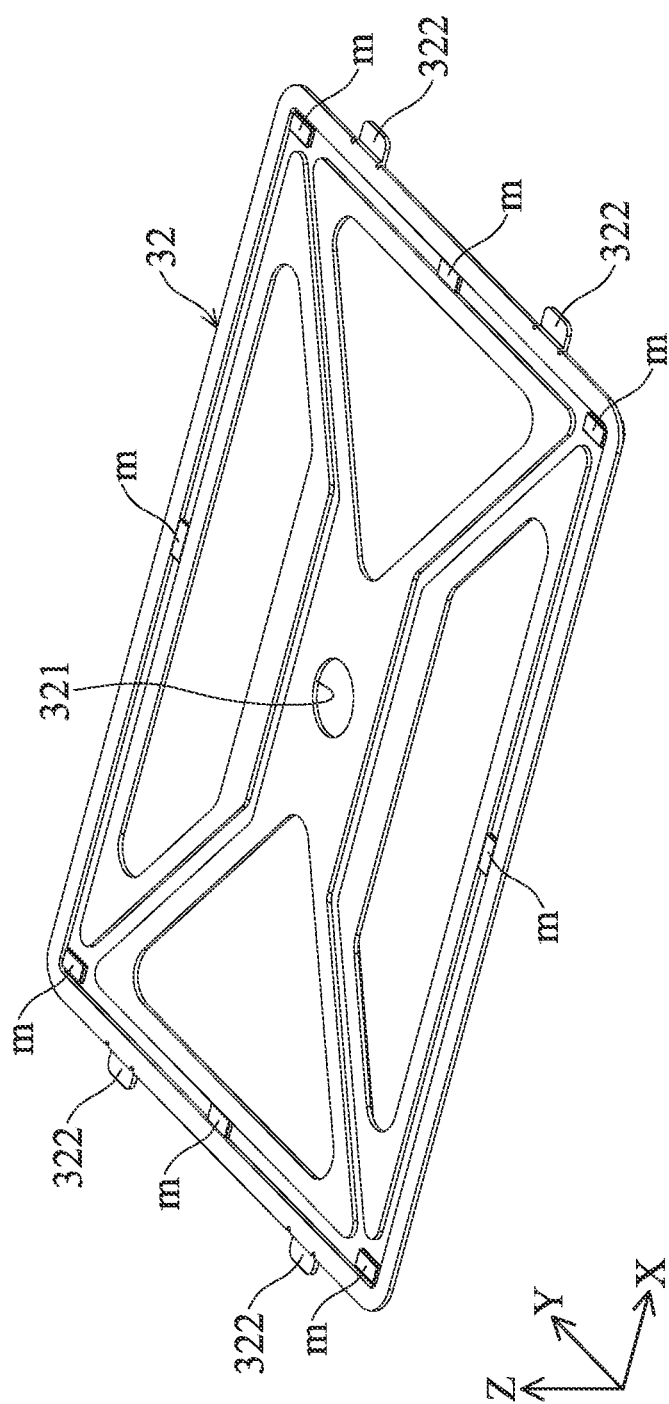
FIG. 9 is a perspective diagram showing the frame 32 and the second magnetic elements m disposed on the frame 32.
Figure 10:
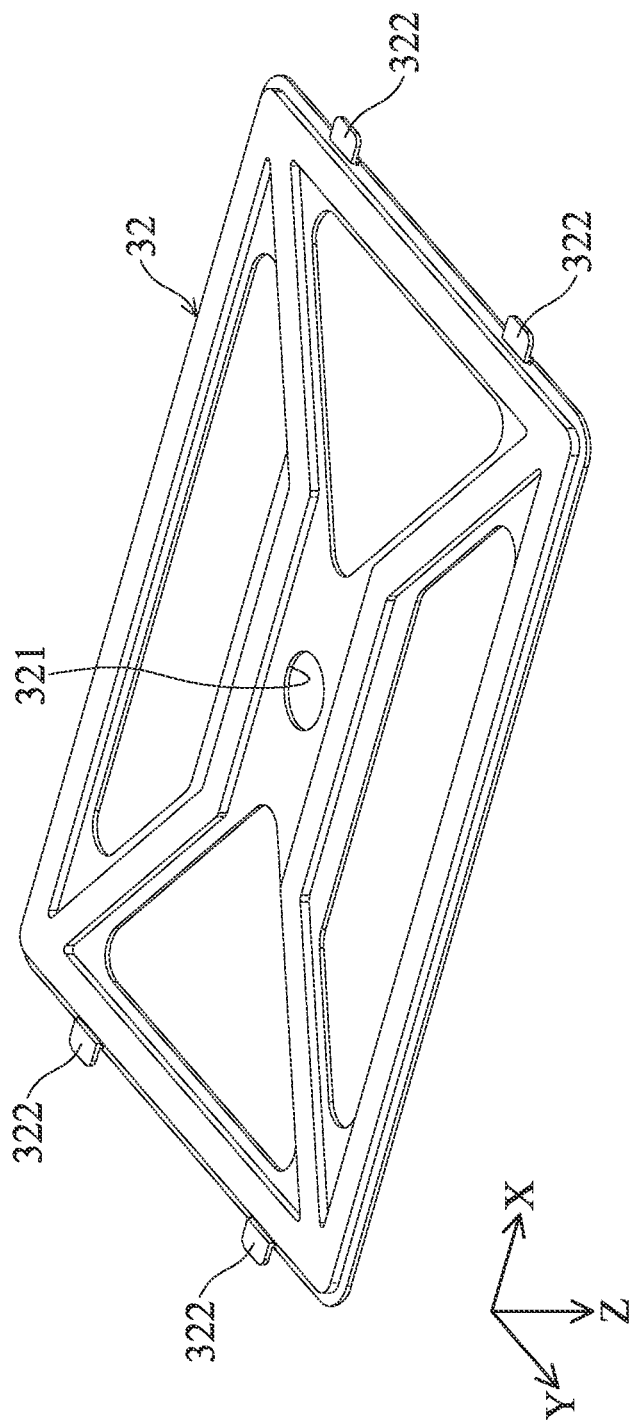
FIG. 10 is another perspective diagram showing the frame 32 and the second magnetic elements m disposed on the frame 32.
Figure 11:
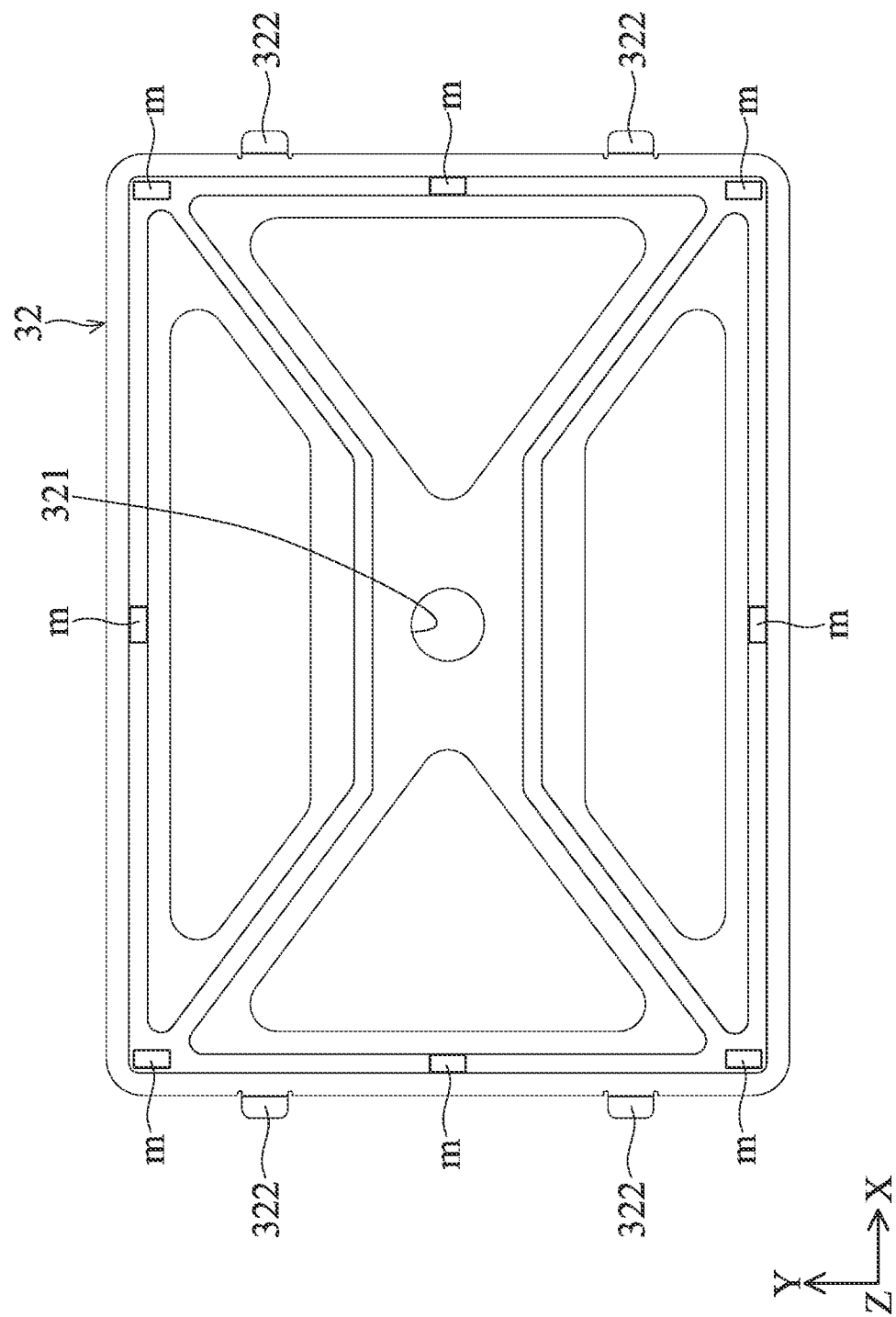
FIG. 11 is a top plan view of the frame 32 and the second magnetic elements m disposed on the frame 32.

FIG. 9 is a perspective diagram showing the frame 32 and the second magnetic elements m disposed on the frame 32. FIG. 10 is another perspective diagram showing the frame 32 and the second magnetic elements m disposed on the frame 32. FIG. 11 is a top plan view of the frame 32 and the second magnetic elements m disposed on the frame 32.

Referring to FIGS. 9, 10, and 11, the frame 32 has a rectangular structure, wherein the second magnetic elements m are affixed to the top surface and located close to the four sides of the frame 32. It should be noted that the first magnetic elements M at least partially overlap the second magnetic elements m when viewed in a vertical direction (Z axis) perpendicular to the protection layer 34, and the first and second magnetic elements M and m do not contact each other.

Moreover, as shown in FIGS. 9, 10, and 11, a plurality of lock tabs 322 are formed on the left and right sides of the frame 32. During assembly of the touchpad unit 30, the lock tabs 322 of the frame 32 are joined in the openings 312 of the bottom plate 31, whereby the frame 32, the touch control circuit board 33, and the protection layer 34 can be prevented from separation from the accommodating space 310.

Figure 12:
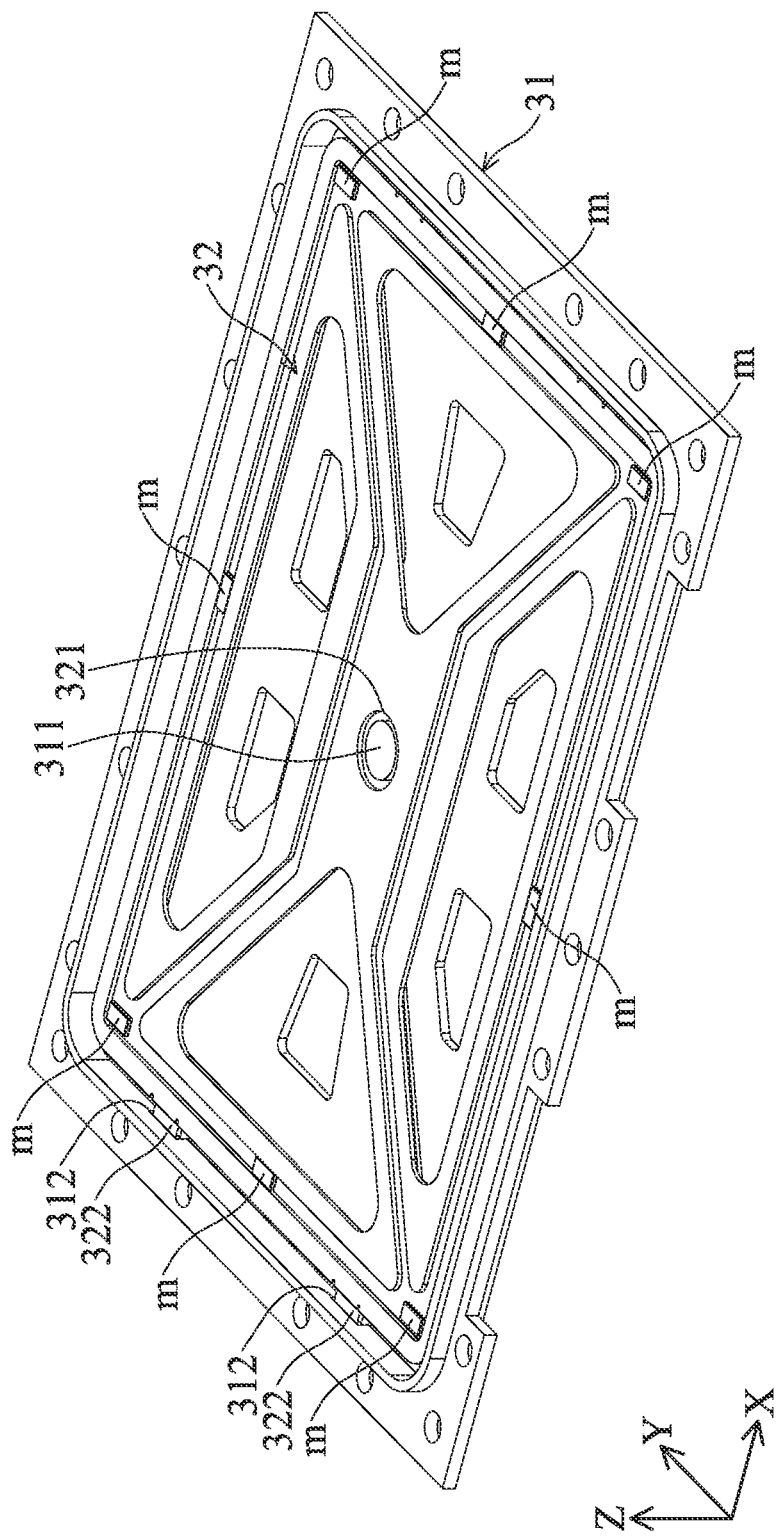
FIG. 12 is a perspective diagram showing the bottom plate 31, the frame 32, and the first and second magnetic elements M and m after assembly.
Figure 13:
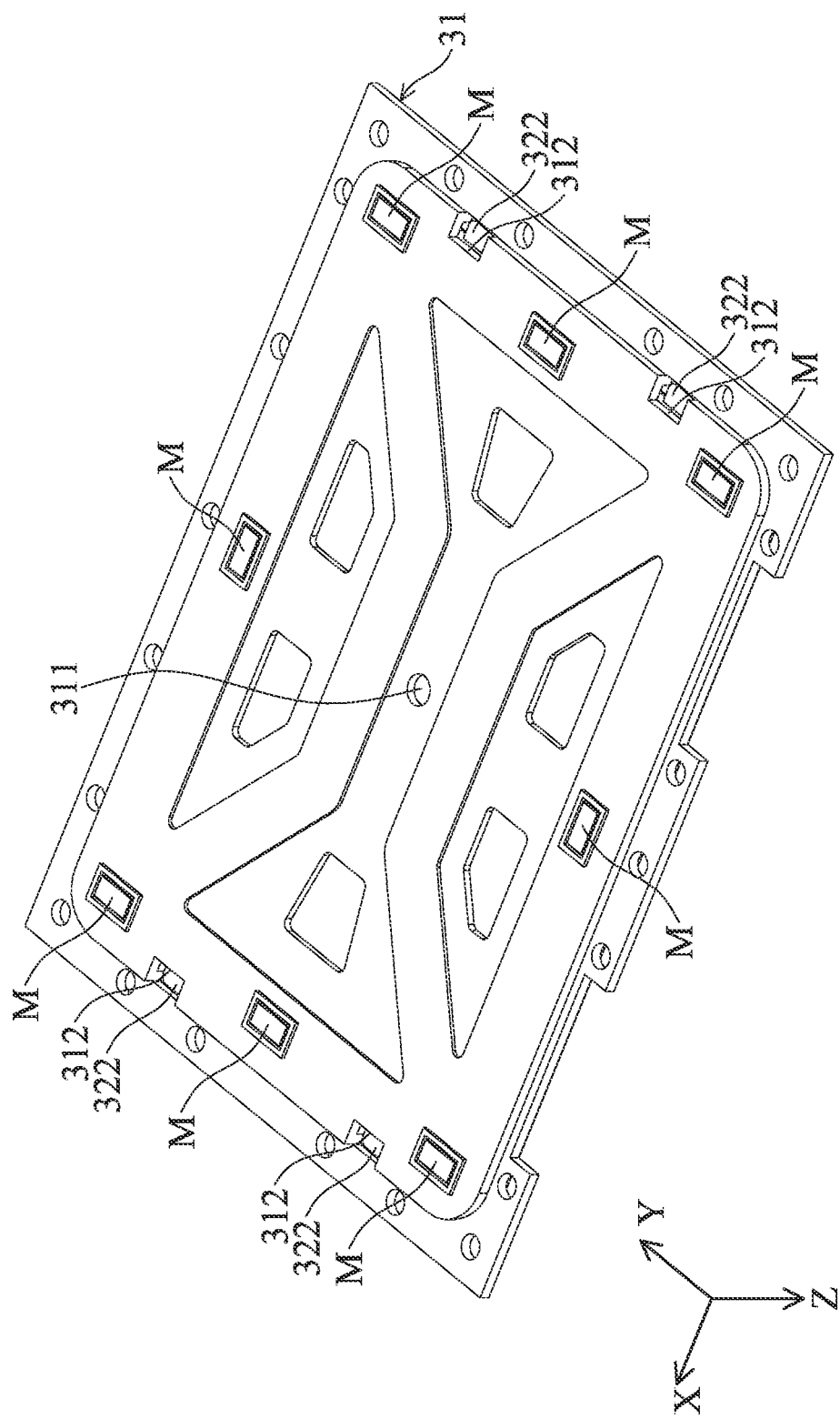
FIG. 13 is another perspective diagram showing the bottom plate 31, the frame 32, and the first and second magnetic elements M and m after assembly.
Figure 14:
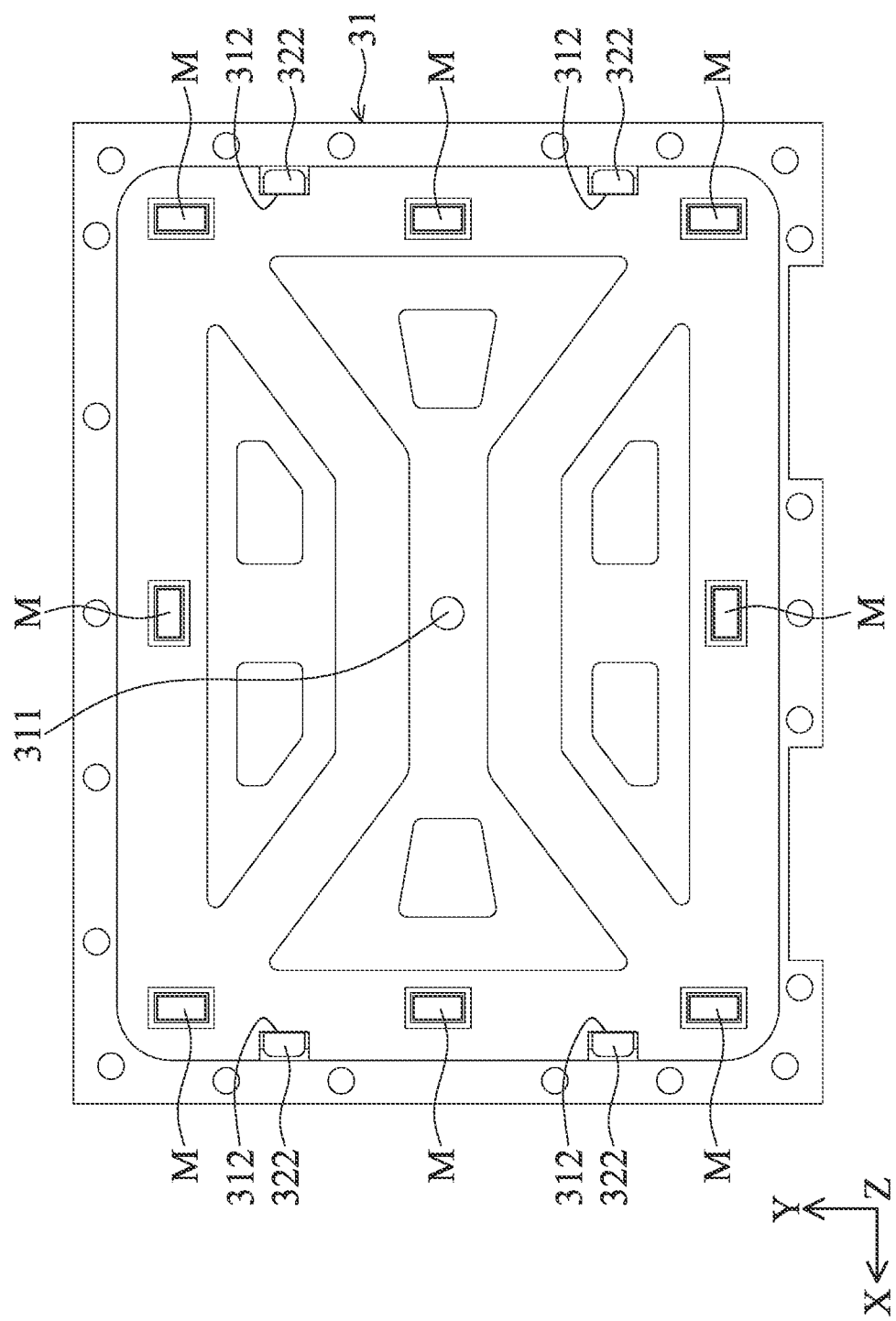
FIG. 14 is a bottom plan view of the bottom plate 31, the frame 32, and the first and second magnetic elements M and m after assembly.
Figure 15:
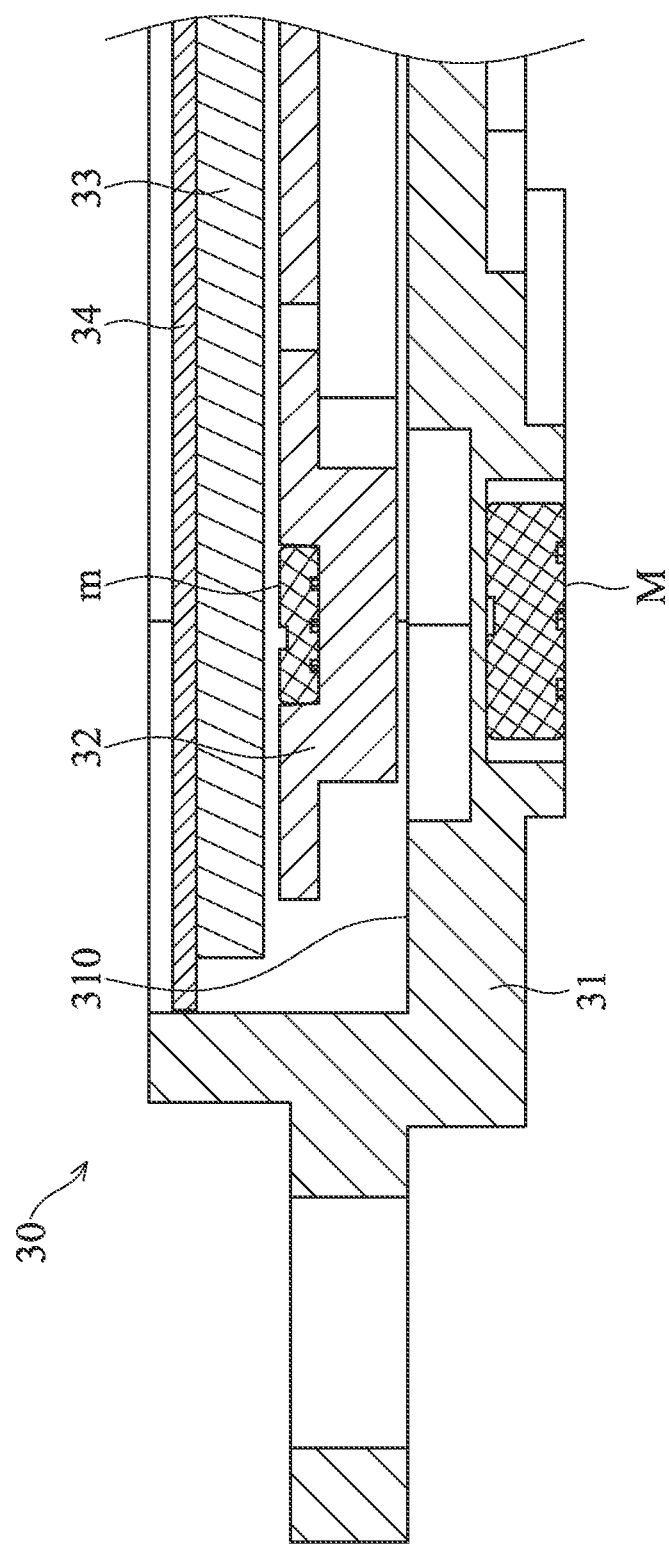
FIG. 15 is a partial enlarged sectional view taken along line A1-A2 in FIG. 4.

FIG. 12 is a perspective diagram showing the bottom plate 31, the frame 32, and the first and second magnetic elements M and m after assembly. FIG. 13 is another perspective diagram showing the bottom plate 31, the frame 32, and the first and second magnetic elements M and m after assembly. FIG. 14 is a bottom plan view of the bottom plate 31, the frame 32, and the first and second magnetic elements M and m after assembly. FIG. 15 is a partial enlarged sectional view taken along line A1-A2 in FIG. 4.

Referring to FIGS. 12-15, since the first magnetic elements M (e.g. magnets) are disposed on the bottom plate 31, and the second magnetic elements m (e.g. magnets) are disposed on the frame 32, a repulsion force can be generated between the first and second magnetic elements M and m, whereby the frame 32, the touch control circuit board 33, and the protection layer 34 are held in the initial position. In this state, the switch element S is spaced apart from and not triggered by the protrusion 311 of the bottom plate 31.

However, when the user exerts an external force on the top surface of the protection layer 34, the frame 32, the touch control circuit board 33, and the protection layer 34 move downward (−Z direction) relative to the bottom plate 31 from an initial position to a limit position, so that the switch element S on the bottom side of the touch control circuit board 33 is triggered by the protrusion 311 of the bottom plate 31. Therefore, the user can perform a click action on a menu or input instructions by pushing the touchpad unit 30.

When the external force is released, the repulsion force generated by the first and second magnetic elements M and m can impel the frame 32, the touch control circuit board 33, and the protection layer 34 to move upward (Z direction) and return back to the initial position.

In summary, the invention provides a touchpad unit 30 that does not need any hinges to connect the bottom plate 31 with the frame 32, the touch control circuit board 33, and the protection layer 34. Specifically, with the first and second magnetic elements M and m evenly arranged on the bottom plate 31 and the frame 32, the forces exerted on different positions of the touchpad can be equal, whereby the users can touch anywhere on the touchpad unit 30 without ambiguous haptic feedback and incorrect instructions to the electronic device 100.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a display module;
   an input module, connected to the display module;
   a touchpad unit, having a bottom plate, a frame, a touch control circuit board, a protection layer, and a switch element, wherein the bottom plate is affixed to the input module, the protection layer is disposed on a top surface of the touch control circuit board, the frame is disposed on a bottom surface of the touch control circuit board, and the switch element is disposed on the touch control circuit board, wherein the frame, the touch control circuit board, and the protection layer are movably received in an accommodating space of the bottom plate;
   a plurality of first magnetic elements, disposed on the bottom plate; and
   a plurality of second magnetic elements, disposed on the frame, wherein the first and second magnetic elements generate a repulsion force to hold the frame, the touch control circuit board, and the protection layer in an initial position relative to the bottom plate;
   wherein when an external force is exerted on the protection layer, the frame, the touch control circuit board, and the protection layer move toward the bottom plate from the initial position to a limit position, and the switch element is pressed and triggered by the bottom plate;
   wherein the bottom plate and the frame respectively have a rectangular structure, the first magnetic elements are arranged close to four sides of the bottom plate, and the second magnetic elements are arranged close to four sides of the frame.

2. The electronic device as claimed in claim 1, wherein the first magnetic elements and the second magnetic elements at least partially overlap when viewed in a vertical direction perpendicular to the protection layer.

3. The electronic device as claimed in claim 1, wherein the first magnetic elements are disposed on a bottom side of the bottom plate, and the second magnetic elements are disposed on a top side of the frame.

4. The electronic device as claimed in claim 1, wherein the frame has a through hole, and the switch element extends through the through hole.

5. The electronic device as claimed in claim 1, wherein the bottom plate has a protrusion, and when the external force is exerted on the protection layer, the switch element is pressed and triggered by the protrusion.

6. The electronic device as claimed in claim 1, wherein the protection layer comprises electrical insulating material, and the frame comprises a metal material.

7. The electronic device as claimed in claim 1, wherein the bottom plate forms a plurality of openings, and the frame forms a plurality of lock tabs joined in the openings.

8. The electronic device as claimed in claim 7, wherein the lock tabs are located on opposite sides of the frame.

* * * * *